PARTY-LINE TELEPHONE SYSTEM

Filed March 14, 1956

INVENTOR

E. L. Skogsberg

BY Glascock Downing & Seebold

ATTORNEYS

July 12, 1960 E. L. SKOGSBERG 2,945,095

PARTY-LINE TELEPHONE SYSTEM

Filed March 14, 1956 3 Sheets-Sheet 2

INVENTOR

E. L. Skogsberg

BY Glascock Downing & Seebold

ATTORNEYS

INVENTOR
E. L. Skogsberg

BY Glascock Downing & Seebold
ATTORNEYS 2,945,095

PARTY-LINE TELEPHONE SYSTEM

Erik Lennart Skogsberg, Domarevagen 15, Huddinge, Sweden

Filed Mar. 14, 1956, Ser. No. 571,434

Claims priority, application Sweden Apr. 2, 1955

6 Claims. (Cl. 179—17)

The invention relates to a telephone system and more particularly to a multi-party telephone system.

An object of the invention is to provide a simple and effective system for identifying the calling station on a multi-station telephone system.

Another object of the invention is to generate an identification alternating current signal by means of a transistor-generator, which signal is of a predetermined length.

A further object of the invention is to obtain a selective call signal for calling of a particular party station of the multi-party stations connected to a line and for control of that correct apparatus answers the call.

Another object of the invention is to use a transistor-generator fed from the exchange over the line, whereby a current source at each subscriber's telephone may be dispensed with.

Figures 1, 1A, 1B:
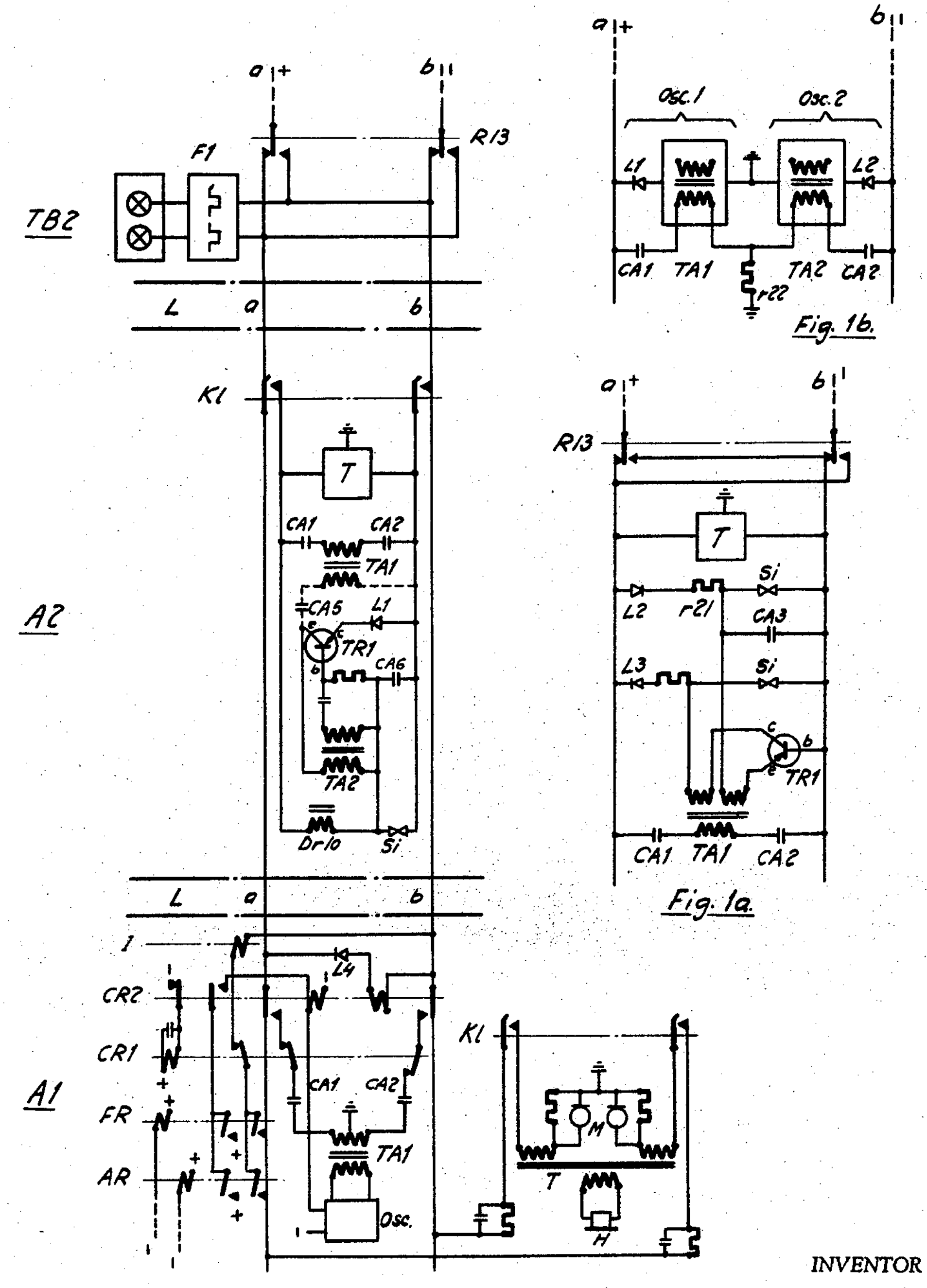
Figure 2:
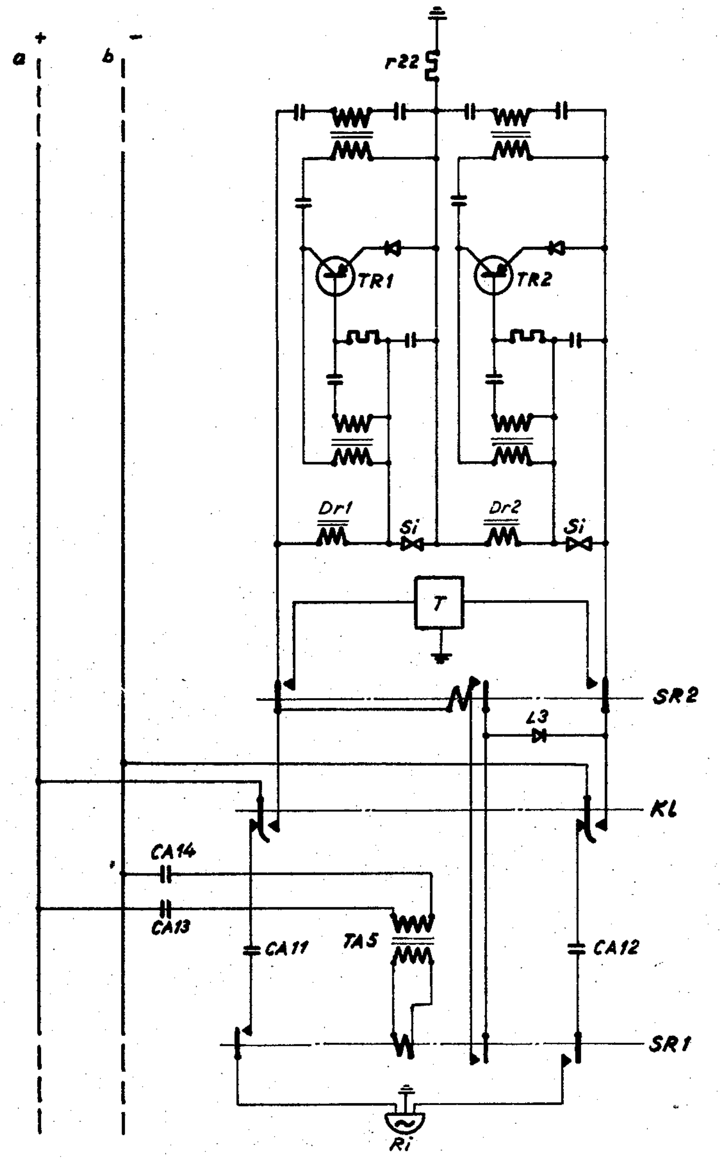
Figure 3:
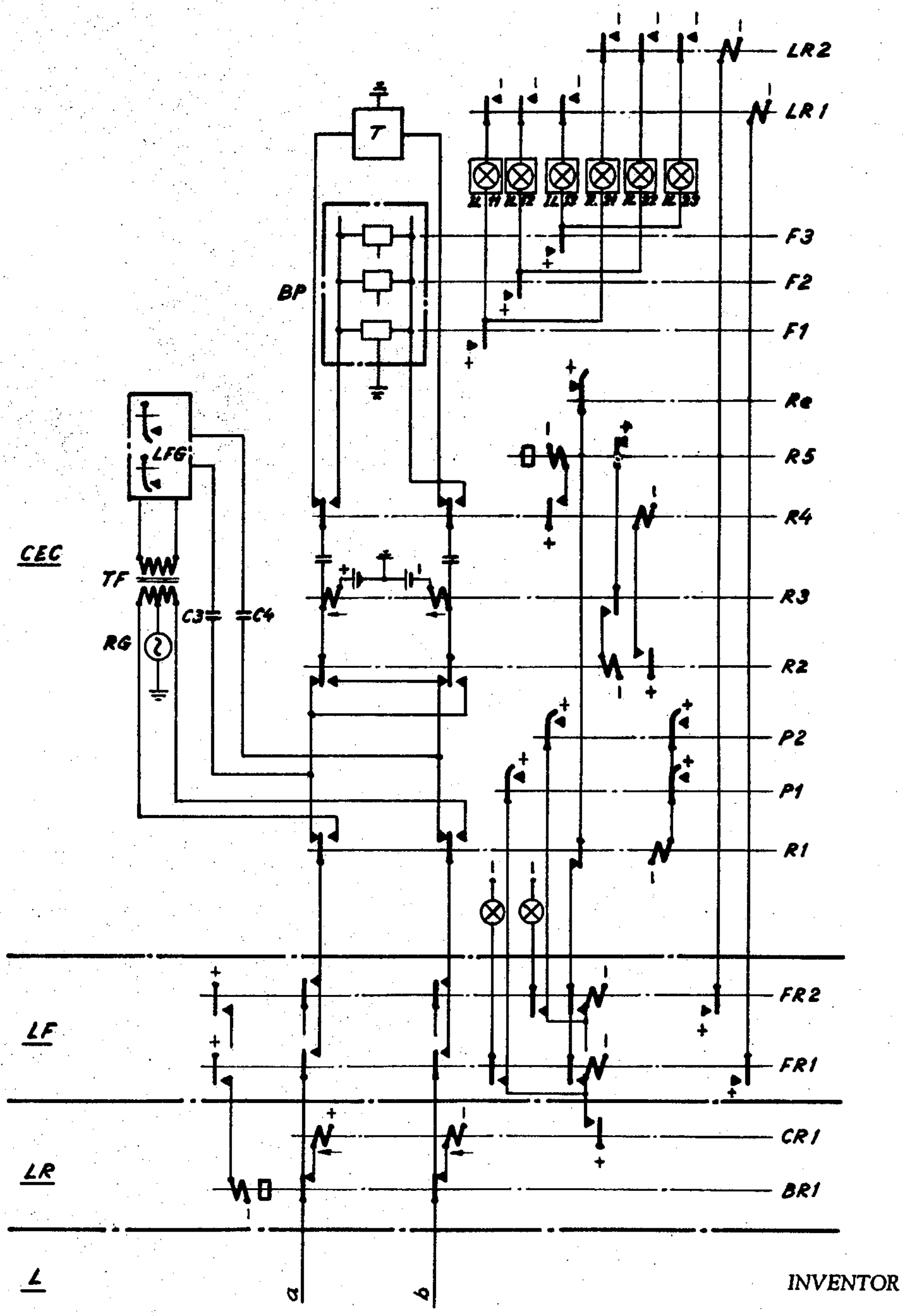

A number of specific embodiments of the invention will now be described with reference to the accompanying drawings, in which Fig. 1 illustrates one embodiment of the telephone system; Fig. 1*a* illustrates an alternative embodiment of a transistor oscillator usable in Fig. 1; Fig. 1*b* illustrates still another alternative embodiment of a transistor oscillator usable in Fig. 1; Fig. 2 is a detailed illustration of a telephone station; and Fig. 3 is a detailed illustration of the telephone exchange usable with the station of Fig. 2.

In Fig. 1, L designates a telephone line comprising the line conductors *a* and *b*, A1 an automatic fire alarm system connected to the line, A2 a telephone station connected to the same line and TB2 the exchange equipment of the line. Although not shown, a number of fire alarm systems and telephone stations may be connected to the same line.

In the fire alarm system's connection relay set A1, is shown as including relay AR and relay FR, which two relays in known manner are respectively responsive to alarm and fault signals in the fire alarm system. There are further two relays CR1 and CR2 of which the purpose will be explained hereinafter. There is also shown a low frequency oscillator OSC, which may be of conventional type with its output transformer TA1 and the condensers CA1 and CA2. Furthermore there is included speech equipment of a conventional type comprising an induction coil T, a microphone M and a receiver H. The microphone is divided into two halves and its center point is connected to earth thereby providing for speech connection with the exchange even when one of the line conductors is faulty, e.g. over one of the line conductors and earth. The speech equipment is connected to the line by the switch hook KL when the handset is removed.

When the automatic fire alarm system A1 gives off an alarm or fault signal the identification works in the following way. The relay FR is released at a fault signal and relay AR at an alarm signal thereby connecting the inductance I between the line conductors *a* and *b*.

This is in known manner indicated by a relay in the exchange (not shown) which relay operates another relay, R13, which reverses the polarity of the line conductors. When the polarity of the line conductors is reversed, current is free to flow through the rectifier L4 and the winding of relay CR2 which relay operates and releases delay acting relay CR1. During the time the relays CR1 and CR2 both are in an actuated position, the oscillator OSC with its output transformer TA1 and condensers CA1 and CA2 is connected to the line conductors. The oscillator obtains power over contacts on the relays AR, FR and CR2, relay CR2 also receiving holding current over the same contacts. The oscillator generates a certain frequency until the relay CR1 is released. This frequency is amplified by the amplifier F1, which has built in band pass filters for separation of frequencies, and operates the signal lamps in the exchange circuit TB2. In order to establish if an alarm or a fault signal, e.g. if relay AR or FR has been released in the automatic alarm system A1 one of these relays, for example FR, may start an impulsing unit (not shown) which provides for the transmission the oscillator frequency in pulses. Another way is to provide the relays FR and AR with contacts that tunes the oscillator to a certain frequency for each of the relays which then may be indicated in the exchange circuit TB2.

The telephone station A2, Fig. 1, functions in the same way as A1, but the oscillator, which here is shown more in detail is a transistor oscillator. The speech equipment T, which is substantially identical with that shown in A1, is indicated in block diagrammatic form. The oscillator obtains its power from the exchange equipment over the line conductors and a low pass-filter DR10 with the condenser CA6. In order to block the transistor from getting to high voltages a varistor S*i* is connected in the circuit. The oscillator frequency may be obtained either through an extra winding on the transformer TA2 or over a condenser CA5 and the output transformer TA1. In order to operate the oscillator only when the polarity of the line conductors is reversed a rectifier L1 is connected in series with the transistor. Thus the relays CR1 and CR2 are unnecessary in the telephone system since relay R13 is arranged to reverse the polarity of line for only a certain time during which time the oscillator works. This arrangement has special value when a power supply can not be obtained at the telephone station. Naturally the rectifier L1 may be replaced by any other device sensitive of the current direction, e.g. a relay device, which, upon current reversal on the line branches, connects the oscillator in such a way that it will work by current from the exchange over the line during a predetermined time. The exchange equipment may either be a manually operated switchboard or automatically working line finders and other circuits.

A variation of the transistor oscillator is shown in Fig. 1*a*. In order to obtain oscillation during a certain time, the transistor characteristic requiring the emitter *e* and the collector *c* shall have different potentials in relation to the base *b* is utilized. Thus the condenser CA3 is charged through the rectifier L2 and resistor *r*21 at normal polarity of the line conductors. When the polarity of the line is reversed the collector *c* receives the right polarity through the rectifier L3, and the emitter *e* receives the right polarity from the recharging condenser CA3. During this time the oscillator will work and be identified in the exchange in the manner previously described.

Fig. 1*b* illustrates how two oscillators OSC1 and OSC2 can be connected to the line. These oscillators are of the same type as has been described in Figs. 1 and 1*a*.

With this arrangement the oscillator's frequency can be obtained in the exchange equipment even when one of the line conductors is broken since one of the oscillators is connected between the *a*-conductor and earth while the other oscillator is connected between the *b*-conductor and earth. These two oscillators are synchronized with each other through the resistor *r*22 or any other circuit in a known manner.

The oscillator arrangement in Fig. 1*b* is shown in a more detailed version in Fig. 2 where it has been combined with means for calling the telephone station from the exchange. This means comprises the frequency sensitive relay SR1 with its matching transformer TA5, a connecting relay SR2 and a bell R*i*. A certain number of such telephone stations may be connected to the line, but for the sake of simplicity only one is shown.

The exchange equipment TB2 to be employed is shown in Fig. 3, where LR designates a line relay set, IF the line finder (only shown as a relay for each line), and CEC the common exchange circuit.

When the handset of the telephone station is removed the hook K1 is actuated and the station is connected to the line. This operates relay CR1 in LR Fig. 3 and starts the line finder LF which connects the line to the common exchange circuit CEC and operates the relay BR1. Relay BR1 breaks the connection of relay CR1 to the line. Relay R3, in CEC, is then actuated causing relay R2 to operate. Relay R2 reverses the polarity of the line conductors whereby the oscillators in the telephone station start. Relay R2 also operates relay R4 which connects the frequency selective amplifier BP to the line. The amplifier selects the frequency given off at the telephone station and actuates one of the contacts F1, F2 or F3 depending upon the frequency. One of the three lamps IL11—12—13 is lighted over the relay LR1 operated by the line finder LF thereby identifying the calling station. This operation occurs during the delayed action of relay R5 which is connected by relay R4. The lamps IL11—23 can be provided with holding means in order to remain lighted. When relay R5 operates it releases relay R2 whereupon relay R4 is released but relay R5 remains holding itself over its own contacts. When relay R2 releases the polarity of line goes back to normal and the oscillation stops in the telephone station. When relay R4 releases the speech equipment T in the exchange is connected to the line. As one of the lamps IL now shows which station has called the operator of the exchange connects a certain frequency from the generator LFG through the condensers C3 and C4 to the line. This frequency of generator FG corresponds to the station which has called and operates the frequency sensitive relay SR1 in the calling station through the condensers CA13, CA14 and the matching transformer TA5. When relay SR1 operates, the relay SR2 is connected to the line through the rectifier L3 and operates, thereby getting holding current over its own contact and connecting the speech equipment T of the station to the line. The speech connection is then established and may be transferred in a known manner to other lines connected to the exchange. The frequency from the generator LFG, operating the relay SRI, may of course be connected to the line in any automatic way, for example by contacts on F1, F2 and F3.

When the call is finished the operator of the exchange actuates the key Re thereby breaking the holding currents for relay R5 and the line finder LF. Thereupon the relays in the exchange equipment are restored and during the delayed action of relay BRI the current through the line conductors and the relay SR2 is interrupted whereupon the speech equipment is released and disconnected in the telephone station.

If the operator of the exchange wants to call one of the telephone stations connected to one of the lines he depresses one of the keys P1 or P2 thereby causing the line finder LF to connect the wanted line to the common exchange circuit CEC. At the same time the relay R1 is operated and connects the line in question to the transformer TF and the ringing generator RG. A ringing current is then fed to the line conductors and earth, but as no bell in any of the telephone stations is connected to the line, no bell will ring. The operator then, while pressing one of the keys P1 or P2, connects a certain frequency, corresponding to the telephone station wanted, from the generator LFG to the secondary winding of the transformer TF and this frequency too is induced on the line. This frequency, as previously described, operates the frequency sensitive relay SRI at the desired telephone station through the condensers CA13, CA14 and the transformer TA5. The relay SRI connects the bell R*i* to the line through the condensers CA11 and CA12. The center point of the bell is connected to earth and the bell then will ring by current from the generator RG in the exchange equipment. In due time the operator releases the key P1 or P2 and the ringing will stop. When the call is answered at the telephone station, this answer goes through to the exchange in exactly the same way as has been described before, concerning a call from the telephone station. Naturally in this case the frequency generator LFG can be preset in some way so that only the called telephone station is connected. As shown in the figures the speech equipments have their center points connected to earth so that speech connection as well as identification and calling is established even if one of the line conductors is faulty. The lines may also be controlled by a steady current to indicate when a break has occurred on the line.

Metering devices, of which the operating in known manner can be made dependent of the answer of the called apparatus, may be connected over contacts on said device holding the lamps L11—L23 lighted. To avoid connection of the metering device at a call to a party-time station, the connection of the metering device may either be made dependent of the signal sending from the operator to the called telephone station, or may happen in the conventional manner in a telephone system; i.e. at a call from the party-line station only.

What I claim is:

1. In a telephone system, a two conductor line; a central exchange coupled to said line and having an electrical energy source for energizing said line in an initial polarity, first circuit closure means actuable for reversing the initial polarity of said energized line, a plurality of normally unactuated indicator means, signal frequency amplifier and second circuit closure means for selectively actuating one of said indicator means in response to the signal transmitted thereto; a plurality of party stations, each having manually operable third circuit closure means for operatively coupling said station across said line, a transistor oscillator tuned to generate a particular frequency signal individual to said station, unidirectional conductive circuit means for rendering said oscillator operable upon reversal of the initial polarity of said energized line, subsequent to the coupling of said station thereto thereby enabling transmission of said particular frequency signal to said signal frequency amplifier means at said central exchange.

2. In a telephone system, a two conductor line; a central exchange coupled to said line and having an electrical energy source for energizing said line in an initial polarity, first switching means actuable for reversing the initial polarity of said energized line, a plurality of normally unactuated identification means, signal frequency amplifier and second switching means for selectively actuating one of said identification means in response to a signal transmitted thereto; a plurality of individual party stations, each having manually operable third switching means for operatively coupling said station to said line and for actuating said first switching means, transistor oscillator means tuned to develop a particular frequency signal individual to said respective station, unidirectional energy conductive means for rendering said oscillator means operable upon reversal of the initial polarity of said energized line subsequent to the coupling of said station thereto thereby enabling transmission of said developed particular frequency signal to said signal frequency amplifier means for actuation of one of said identification means indicative of the station coupled to said line.

3. In a telephone system according to claim 2 wherein said transistor oscillator means comprises a pair of transistor oscillator circuits serially coupled across said line and having the common junction therebetween coupled to ground.

4. In a telephone system according to claim 2 wherein said central exchange further includes fourth switching means actuable a predetermined time after actuation of one of said identfication means for deactuating said first switching means thereby to resume the initial polarity energization of said two conductor line.

5. In a telephone system according to claim 2 wherein said central exchange still further includes a frequency signal generator adaptable to be manually tuned to impress across said two conductor line a signal having a frequency correlative to the actuated one of said identification means, and said plurality of party stations each include a speaker, and fifth switching means selectively responsive to the frequency of said signal generator for operatively coupling said speaker to said line.

6. In a telephone system according to claim 5 wherein said central exchange still further includes a ringing generator, sixth switching means for coupling said ringing generator to said line, and said plurality of party stations each include a bell operatively responsive to said ringing generator.

References Cited in the file of this patent

UNITED STATES PATENTS

| | | |
|---|---|---|
| 2,164,033 | Halligan | June 27, 1939 |
| 2,277,228 | Hecht | Mar. 24, 1942 |
| 2,387,671 | Lundstrom | Oct. 23, 1945 |
| 2,562,594 | Bielenberg | July 31, 1951 |
| 2,581,900 | Baker | Jan. 8, 1952 |
| 2,615,094 | Mitchell | Oct. 21, 1952 |
| 2,717,279 | Matlack et al. | Sept. 6, 1955 |
| 2,782,259 | Dimond | Feb. 19, 1957 |